United States Patent [19]

Csanady, Jr.

[11] Patent Number: 4,709,785

[45] Date of Patent: Dec. 1, 1987

[54] RETROFIT FRICTION-HYDROSTATIC EMERGENCY LUBRICATION SYSTEM FOR A LARGE ROTATING SHAFT

[75] Inventor: Michael Csanady, Jr., Ridley Park, Pa.

[73] Assignee: Westinghouse Electric Corp., Pittsburgh, Pa.

[21] Appl. No.: 902,728

[22] Filed: Sep. 2, 1986

[51] Int. Cl.$^4$ ............................................. F01M 1/00
[52] U.S. Cl. ................................. 184/6.4; 184/21.2; 417/229; 417/319
[58] Field of Search ............... 184/6.3, 6.4, 6.11, 184/27.1, 27.2; 417/223, 319, 233, 229; 60/39.08

[56] References Cited

U.S. PATENT DOCUMENTS

| | | | |
|---|---|---|---|
| 1,647,135 | 11/1927 | Johnson | 184/6.4 |
| 2,188,464 | 1/1940 | Moorman | 417/233 X |
| 2,402,467 | 6/1946 | Thompson | 60/39.08 X |
| 2,711,071 | 6/1955 | Frankel | 184/6.3 X |
| 2,751,749 | 6/1956 | Newcomb | 60/39.08 |
| 3,187,674 | 6/1965 | Hammelmann | 417/223 |
| 4,213,743 | 7/1980 | Hurt et al. | 417/229 |
| 4,309,870 | 1/1982 | Guest | 60/39.08 |
| 4,446,377 | 5/1984 | Kure-Jensen et al. | 184/6.11 X |
| 4,629,033 | 12/1986 | Moore et al. | 184/6.4 X |

*Primary Examiner*—Leonard E. Smith
*Attorney, Agent, or Firm*—F. J. Baehr, Jr.

[57] ABSTRACT

A retrofit emergency lubrication system utilizing friction-hydrostatic drive is disclosed. The retrofit system provides an emergency lubrication system backup to existing bearing lubrication systems such as for turbine-generator rotors. The retrofit system utilizes actuators to detect low bearing oil pressure and to activate resilient wheels to contact the rotor which drive high pressure pumps. The high pressure pumps in turn drive a hydraulic motor pump which in turn drives an oil supply tank pump.

14 Claims, 6 Drawing Figures

RETROFIT FRICTION-HYDROSTATIC EMERGENCY LUBRICATION SYSTEM FOR A LARGE ROTATING SHAFT

BACKGROUND OF THE INVENTION

This invention relates to an emergency lubrication system for supplying oil to bearings and, in particular, to an emergency lubrication system for supplying lubricating oil to bearings for a large rotating shaft such as as a steam turbine rotor. Large rotating shafts such as a steam turbine rotors require that the bearings supporting them be well lubricated at all times during rotation of the shafts. Large steam turbine rotors used in power plants take about 25 to 75 minutes for coastdown to rest. In existing lubrication systems maintaining an oil supply to the bearings of the rotor of a steam turbine is typically dependent upon electrical power. Some lubrication systems utilize a DC backup to maintain the lubrication system operational during coastdown when there is an AC power failure at the plant. The DC system is powered by batteries that are normally maintained in a fully charged condition. Serious problems will result if the lubrication system is not maintained operational during coastdown of the rotor. In the case of the DC backup if that system should fail for any reason and there is a total loss of AC and DC, the bearings supporting the rotor would suffer a catastrophic failure resulting in extended downtime and great expense to the utility to replace the damaged bearings and other associated equipment. Other designs have used a steam powered pump to maintain flow of oil to the bearings during coastdown.

U.S. Pat. No. 4,309,870 issued to Neil A. Guest et al., dated Jan. 12, 1982 discloses a primary pump operatively connected to the rotor of a turbomachine and independently driven by a stand-by pump. U.S. Pat. No. 2,402,467 issued to Thompson, dated June 18, 1946, discloses a system of multiple pumps in which the primary oil pump is turbine driven, and scavenge pumps are electrically driven. In addition, an electrical supply pump is energized during startup and shutdown to maintain bearing oil pressure.

U.S. Pat. No. 2,751,749, issued to Philip P. Newcomb, dated June 26, 1956, discloses an arrangement of lubricant pumps such that after shut down of the power plant a pump will be put into operation if the temperature of a bearing or bearings exceeds a predetermined temperature.

Most steam turbines take about 25 to 75 minutes in coastdown. During part of this time the lubricating fluid to the turbing bearings is provided typically by a centrifugal pump connected to the turbine shaft. The oil reservoir tank for the lubrication system is typically as much as 30 to 40 feet below the level of the turbine bearings. At reduced speeds, the centrifugal pump does not have the ability to move the lubricating fluid up from the reservoir tank to the bearings. Normally, the main pumpejector system provides oil to the bearings. As the turbine coasts down from rated speed, shaft main pump pressure varies as the square of the speed, for example at one-half speed, there will be one-quarter the normal operating pressure. At some point there will be insufficient oil to prime the ejector to overcome the elevation head and the suction-discharge from the centrifugal pump will be lost. At rated speeds, say 3600 rpm or 1800 rpm for nuclear, normal operating rotor speed, at 60 Hz, the pressure in the lubrication system is 10 to 15 lbs./sq.in, for example. Typically, there is a pressure switch included that monitors the pressure at the bearings. An auxiliary pump is often included that extends to the bottom of the oil reservoir or tank. In the event the pressure continues to lower and AC power is lost, another pressure switch activates the DC powered pump. The batteries are designed to drive the DC pump typically for about an hour or more.

As stated previously, if the AC and DC backups fail, there will be no oil supply to the bearings. It takes about 5 seconds to destroy the babbitt lining in the bearings with concomitant destruction of the steam turbine blades, shrouds and other internal parts. This occurrence would normally cost millions of dollars to repair together with loss of power generation and income therefrom.

SUMMARY OF THE INVENTION

The present invention provides an emergency lubrication system for the bearings of a large rotating shaft during coastdown which is not dependent upon any form of electrical or steam power for its operation. The present invention utilizes the inertia of the large rotating shaft during coastdown to provide the necessary power to maintain the lubrication system operational. The present invention provides a friction-hydrostatic emergency lubrication system for supplying lubricating oil to a bearing of a large rotating shaft during electrical power outage or any other time that the shaft is rotating and bearing oil pressure cannot be sustained. The bearing is for carrying and maintaining the shaft in position. Lubrication means is provided for lubricating the bearing means. The lubrication means includes oil supply tank means, pumping means for pumping lubricating oil to the bearing and first piping means in fluid communication with the oil supply tank, pumping means and the bearing.

The retrofit friction-hydrostatic emergency system comprises a first sensing and actuator means for sensing and responding to a first predetermined low oil pressure at the bearing. A first rotatable friction means is provided for contacting the shaft. The first sensing and actuator means upon detecting a first predetermined low oil pressure at the bearing causes the first friction means to contact the shaft. A first high pressure pump means having an intake and a discharge is provided. The first high pressure pump means is driven by the friction means. Second piping means is included in fluid communication with the first high pressure pump means and the oil supply tank. A hydraulic motor pump means is in fluid communication with the discharge of the first high pressure pump means. The hydraulic motor pump means is driven by the discharge of the first high pressure pump means. A first oil supply tank pump means is disposed within the oil supply tank. The first oil supply tank pump is driven by the first hydraulic motor pump whereby when the first predetermined low oil pressure is detected during shaft coastdown, the inertia of the shaft drives the emergency lubrication system to maintain an adequate flow of oil to the bearing.

Preferably, the retrofit friction-hydrostatic emergency lubrication system also comprises a second sensing and actuator means responsive to a second predetermined low oil pressure at the bearings. A second rotatable friction means is included for contacting the shaft. The second sensing and actuator means, upon detecting the second predetermined low oil pressure at the bearings, causes the second friction means to contact the shaft. A second high pressure pump is included having an intake and a discharge in fluid communication with the hydraulic motor pump and driven by the second friction means to supplement the first high pressure pump discharge.

Preferably, the first friction means comprises first circular resilient wheel means for contacting the shaft. The first friction means also includes first support means for supporting the first wheel means and first axle means for carrying the first wheel means thereon. The first axle means is supported by the first support means and is disposed parallel to the shaft. The first axle means operatively engages the first high pressure pump.

Preferably, the first support means comprises a first frame, a first bottom member and pair of oppositely disposed first wall members affixed to the first bottom member. The first wall members have the axle means disposed therebetween. A first pedestal base member is provided for supporting the first frame. The first frame is rotatably mounted on the pedestal to engage and disengage the shaft.

Preferably, the support first means comprises first spring means operatively affixed between the first frame and the first pedestal base member whereby the tension of the spring normally holds the first wheel away from the shaft.

The first sensing and actuator means desirably includes first arm member means connecting the first sensing and actuator means to the first frame whereby when the first sensing and actuator means detects the first predetermined low oil pressure at the bearing, the arms means pulls the first wheel means to contact the shaft.

The arm means desirably comprises second spring means whereby slippage of the first wheel is allowed during initial acceleration of the first wheel means upon contacting the shaft.

The first high pressure pump means desirably includes a pair of first high pressure pumps. The first of the first high pressure pumps is mounted on one of the oppositely disposed first wall members and a second of the second high pressure pumps is mounted on the other of the first wall members.

The second friction means desirably includes second circular resilient wheel means for contacting the shaft. Second support means are included for supporting the second wheel means. Third axle means are provided for carrying the second wheel means thereon. The third axle means is supported by the second support means and disposed parallel to the shaft. The third axle means operatively engages the second high pressure pump means.

Preferably, the second support comprises a second frame means, a second bottom member and a pair of oppositely disposed second wall members affixed to the second bottom member. The second wall members have the third axle disposed therebetween. A second pedestal base member is provided for supporting the second frame means. The second frame is rotatably mounted on the second pedestal to engage and disengage the shaft. Preferably, the second support means further comprises third spring means operatively affixed between the second frame and the second base member whereby the tension of the second spring means normally holds the second wheel means away from the shaft.

Desirably, the second sensing and actuator means further comprises second arm member means connecting the second sensing and actuator means to the second frame whereby when the second sensing and actuator means detects the second predetermined low oil pressure at the bearing, the second arm means pulls the second wheel to contact the shaft.

The second arm means preferably comprises third spring means whereby slippage of the second wheel is allowed during an initial acceleration of the second wheel upon contacting the shaft.

Preferably, the second high pressure pump means includes a pair of second high pressure pumps. A first of the second high pressure pumps is mounted on one of the oppositely disposed second wall members and the other of the second high pressure pumps is mounted on the other of the second wall members.

Both first and second wheels are held away from the shaft by the bearing oil pressure piston or diaphragm operator. So whenever bearing oil is below a low predetermined pressure--below the pressure which the last bearing oil pump (DC) will start--the wheels will automatically engage.

BRIEF DESCRIPTION OF THE DRAWINGS

For a better understanding of the present invention, reference may be had to the accompanying drawings in which.

DESCRIPTION OF THE PREFERRED EMBODIMENTS

Figure 1:
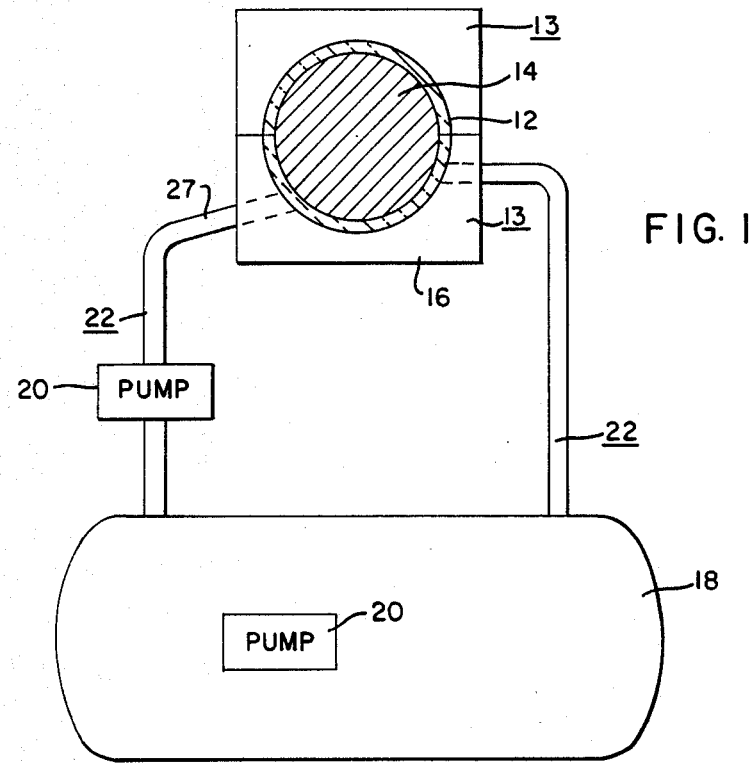
FIG. 1 is an elevational schematic diagram showing a bearing supporting a large rotating shaft and lubrication means connected to the bearing.

Referring to FIG. 1, there is shown a simplified schematic diagram of a typical lubrication system 10 for lubricating bearing means 12 supporting a large rotating shaft 14 such as used for a dynamoelectric machine. The bearing means 12 typically includes housing 16. Lubrication system 10 includes oil supply tank means 18. Pump means 20 is provided for pumping lubricating oil to the bearing 12. Various arrangements of the pumps 20 are well known in the art. First piping means 22 is included in fluid communication with the oil supply tank 18 and the bearings 12. The bearing means 12 includes bearing housing 13 having passages 24 therethrough. First piping means includes passages 24 as is known in the art. The lubrication system 10 thus far described is conventional.

Figure 2:
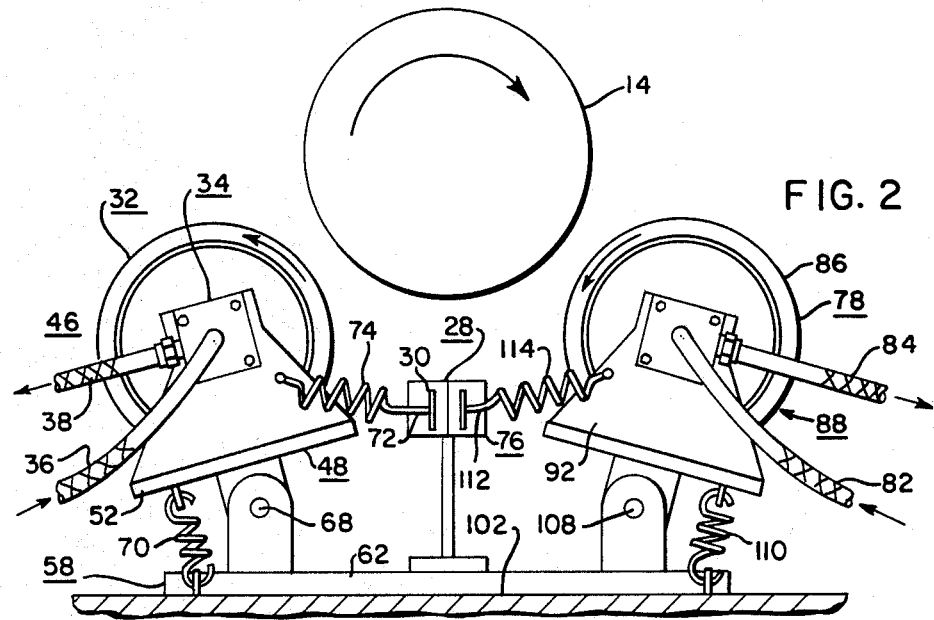
FIG. 2 is an elevational view of the first and second friction means of the friction-hydrostatic emergency lubrication system showing the first and second wheel means in the disengaged position.

Referring to FIGS. 2-6 there is shown a retrofit friction-hydrostatic emergency lubrication system 26. The system 26 includes first sensing and actuator means 28 for sensing and responding to a first predetermined low bearing oil pressure such as 4-6 psi. During normal operation, the oil pressure at the bearings is typically 10–15 psi, for example. The first sensing and actuator means 28 may be of the type having a diaphragm sensitive to pressure connected to a piston or a rod such as manufactured by Bellofram. The rod 30 is shown in FIG. 2.

A first rotatable friction means 32 is included for contacting the shaft 14. The first sensing and actuator means 28, upon detecting the first predetermined low oil pressure at said bearing 12 causes the first friction means 32 to contact the shaft. For example, in a steam turbine, the first friction means 32 may contact any open portion of the rotor that is easily accessible. The present invention utilizes the turbine rotor as the source of energy to drive the friction-hydrostatic system 26. Large rotors such as steam turbine rotors have adequate power at all speeds to drive the friction-hydrostatic system 26 and the added burden imposed by the friction-hydrostatic system 26 on the rotor will reduce the coastdown time.

Figure 6:
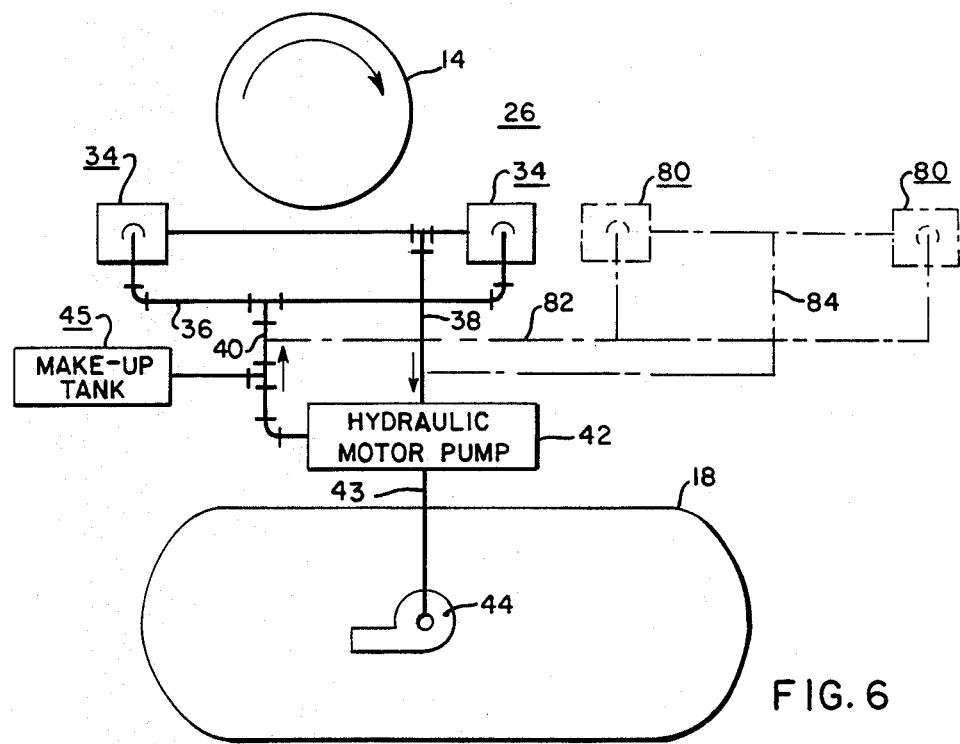
FIG. 6 is a schematic elevational view of the friction-hydrostatic lubrication system showing the fluid circuits.

With reference to FIG. 6. first high pressure pump means 34 are included having an intake 36 and a discharge 38. The first high pressure pump means 34 is driven by the first friction means 32. Second piping means 40 is in fluid communication with the first high pressure pump 34 and the oil supply tank means 18. A hydraulic motor pump means 42 is in fluid communication with the discharge 38 of the first high pressure pump means 34. The hydraulic motor pump 42 is driven by the discharge 38 of the first high pressure pump means 34. A first oil supply tank pump means 44 is disposed within the oil supply tank 18. Make-up tank 45 is provided for the hydraulic pump circuit. The first oil supply tank pump 44 is driven by the first hydraulic pump 42 through shaft 43 whereby when the first predetermined low oil pressure is detected during shaft coastdown, the inertia of the shaft 14 drives the emergency lubrication system 26 to maintain an adequate flow of oil to the bearing means 12.

Preferably, the first friction means 32 comprises first circular resilient wheel means 46 for contacting the shaft 14. First support means 48 for supporting the first wheel means 46. First axle means 50 carrying the first wheel means 46. First axle 50 is supported by the first support 48 and disposed parallel to the shaft 14. First axle 50 operatively engages the first high pressure pumps 34.

Preferably, the first support 48 comprises a first frame means 52 including a first bottom member 54. A pair of oppositely disposed first wall members 56a, 56b are affixed to the bottom member 54. The first wall members 56a, 56b have first aperture means 59 passing therethrough. The first axle 50 extends through the first aperture 50 and engages the first high pressure pumps 34. A first extension member 60 affixed to the bottom member 54 having second aperture means 66 passing therethrough. A first pedestal base member means 58 includes first baseplate means 62. The first frame 52 is rotatably mounted on the first pedestal base member 58 to engage and disengage the shaft 14. The first pedestal base member means 58 also includes a pair of oppositely disposed first vertical side members 64a, 64b fixed to said base plate 62. The vertical side members 64a, 64b having third aperture means 67 therethrough. The extension member 60 is positioned between the vertical side members 64a, 64b. A first pivot member means 68 passing through the second aperature 66 and third apertures 67 thereby permitting the first wheel means to pivot on the pivot member 68.

Preferably, the first support means 48 further comprises first spring means 70 operatively affixed between the first frame means 52 and the first pedestal base means 58 whereby the tension of the first spring 70 normally holds the first wheel 46 away from the shaft 14 as shown in FIG. 2.

Figure 3:
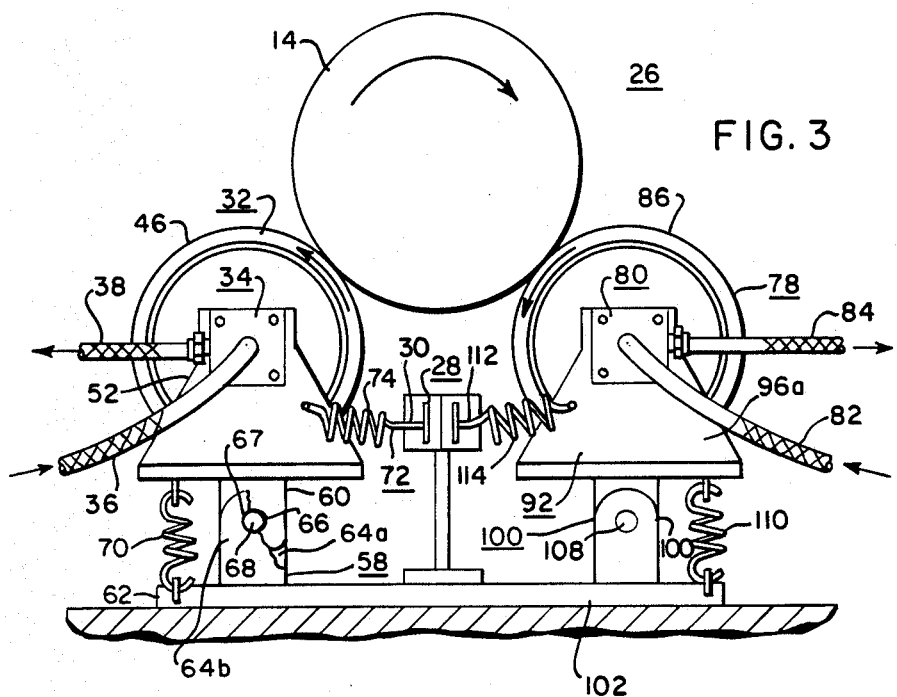
FIG. 3 is an elevational view of the first and second friction means of the friction-hydrostatic lubrication system showing the first and second wheel means in the engaged position.
Figure 4:
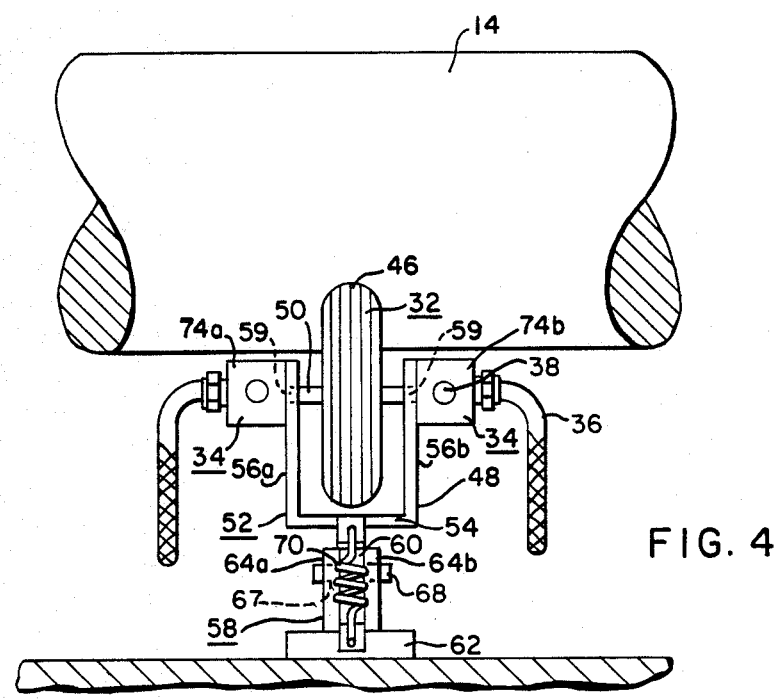
FIG. 4 is a left side elevational view of the friction-hydrostatic lubrication system shown in FIG. 3.
Figure 5:
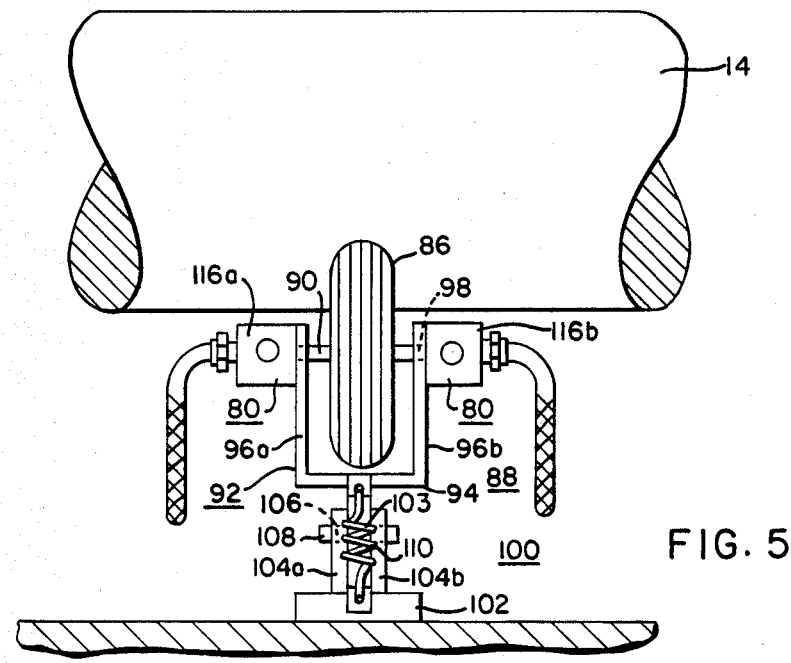
FIG. 5 is a right side elevational view of the friction-hydrostatic lubrication system shown in FIG. 4.

The first sensing and actuator means 28 preferably comprises first arm member means 72 including rod 30, first arm member means 72 connects the first sensing and actuator means 28 to the first frame 52, whereby when the first sensing and actuator means 28 detects the first predetermined low oil pressure at the bearing 12, the first arm 72 pulls the first wheel 46 to contact the shaft 14, as shown in FIG. 3. Preferably, the first arm member 72 comprises second spring means 74 whereby slippage of the first wheel 46 is allowed during initial acceleration of the first wheel upon contacting the shaft 14.

Preferably, the first high pressure pump means 34 includes a first pair of high pressure pumps 74a, 74b. The first of the high pressure pumps 74a is mounted on one of the first oppositely disposed wall members 56a and a second of the high pressure pumps 74b is mounted on the other of the first wall members 56b. The high pressure pumps 74a, 74b are preferably positive displacement pumps which discharge varies depending on the speed of rotation of the first axle 50. Positive displacement pumps are characterized by having high output pressure while utilizing a low volume of fluid. As the shaft coasts down, the output of the first pair of high pressure pumps 74a, 74b decreases.

Preferably, the friction-hydrostatic emergency lubrication system 26 further comprises a second sensing and actuator means 76 responsive to a second predetermined low oil pressure such as 2–4 psi at the bearing means 12. The second sensing and actuator means 76 may be a diaphragm-type actuator as described previously for the first sensing and actuator means 28. A second rotatable friction means 78 is included for contacting the shaft 14. The second sensing and actuator means 76 upon detecting a second predetermined low oil pressure at the bearing 14 causes the second friction means 78 to contact the shaft 14. A second high pressure pump means 80 is included having an intake 82 and a discharge 84. The intake 82 and discharge 84 are in fluid communication with the hydraulic motor pump 42, as shown in FIG. 6, and are driven by the second friction means 78 to supplement the first high pressure pump means 34 discharge. A second friction means 78 preferably comprises second circular resilient wheel means 86 for contacting the shaft 14. Second support means 88 are included for supporting the second wheel means 86. A third axle 90 is supported by the second support 88 and disposed parallel to the shaft 14. The third axle 90 operatively engages the second high pressure pump means 80. The second support means 88 preferably comprises a second frame means 92, a second bottom member 94 and a pair of oppositely disposed second wall members 96a, 96b. Fourth aperture 98 passes through said second wall members. The third axle 90 passes through the fourth aperture 98 and operatively engages the second high pressure pumps 80. A second extension member 99 affixed to the bottom member 94. The second extension member having fifth aperture means 106 passing therethrough. A second pedestal base member means 100 is provided for supporting the second frame 92. The second pedestal base member includes second baseplate means 102 which as shown in FIG. 3 may be the same baseplate as the first baseplate 62. A pair of oppositely disposed second vertical side members 104a, 104b is included each having a fifth aperture 106. A fourth axle 108 is included. The second pivot member means 108 passes through the fourth aperture 103 of the second extension member 99 and the fifth aperture 106 of the second side members 104a, 104b. The second frame 92 is thus rotatably mounted on the second pedestal 100 to engage and disengage the shaft 14.

The second support 88 also desirably includes second spring means 110 operatively affixed between the second frame 92 and the second base member 102 whereby the tension of the second spring normally holds the second wheel 86 away from the shaft 14 as shown in FIG. 2.

The second sensing and actuator means 76 also comprises second arm member means 112 connecting the second sensing and actuator 76 to the second frame 92 whereby when the second sensing and actuator 76 detects the second predetermined low oil pressure at the bearing 12, the second arm 112 pulls the second wheel 86 to contact the shaft. The second actuator 76 overcomes the tension of the second spring 110. Preferably, the second arm 112 comprises fourth spring means 114 whereby slippage of the second wheel 86 is allowed during initial acceleration of the second wheel 86 upon contacting the shaft 14. Inclusion of the second and fourth springs helps to prevent possible damage that may occur to the first and second wheels and associated structure due to the inertia of the shaft 1. The second high pressure pump 80 includes a second pair of high pressure pumps 116a, 116b. The first of the high pressure pumps 116a is mounted on one of the oppositely disposed second wall members 96a and the other of the second high pressure pumps 116b is mounted on the other of the second wall members 96b.

Utilizing the present invention, the emergency lubrication system 26 is not engaged during normal operation of the turbine or generator to preclude excessive wear. The present retrofit system 26 may engage any open section of the rotor of a turbine-generator rotor, for example, automatically at the predetermined low bearing pressures as already stated. The diameters of the first wheel 46 and the second wheel 86 are desirably varied. The shaft 14 or rotor initially during coastdown is operating at relatively high RPM's. As coastdown proceeds, the rotor slows to lower RPM's producing less volume. It is therefore desirable to have a smaller diameter second wheel which will rotate at a faster speed than the first wheel 46 so that the second pump may maintain adequate pressure. The sizing of the wheels would thus depend upon the pressures and the characteristics of the first and second high pressure pumps. By maintaining the volume of lubricating fluid or oil to the hydraulic motor pump 42, the hydraulic pump speed can be maintained to a desired pump speed. The present invention provides ample pressure and volume at low speeds. The retrofit system 26 can be a prepackaged unit that can be assembled and shop tested prior to retrofitting any unit. An alternative arrangement of the rotatable first friction means 32 and second friction means 58 would be to utilize a variable pump-variable motor arrangement. This would limit the number of pump mechanisms at the shaft 14 or turbine rotor, for example. Two high pressure pumps of variable pump type such as a self-compensated piston-type pump could be used for the first and second high pressure pumps. A self-compensated piston-type pump changes stroke of the piston as pressure varies as is known in the art.

I claim:

1. A retrofit friction-hydrostatic emergency lubrication system for supplying lubricating oil to a bearing means for a large rotating shaft during electrical power outage, said bearing means for carrying and maintaining said shaft in position, lubrication means for lubricating said bearing means, said lubrication means including oil supply tank means, pump means for pumping lubricating oil to said bearing means, first piping means in fluid communication with said oil supply tank means and said bearing means, said retrofit friction-hydrostatic emergency lubrication system comprising:
    (a) first sensing and actuator means for sensing and responding to a first predetermined low oil pressure at said bearing means;
    (b) first rotatable friction means for contacting said shaft, said first sensing and actuator means upon detecting said first predetermined low oil pressure at said bearing means causing said first friction means to contact said shaft;
    (c) first high pressure pump means having an intake and a discharge, said first high pressure pump means driven by said friction means;
    (d) second piping means in fluid communication with said first high pressure pump means and said oil supply tank means;
    (e) hydraulic motor pump means in fluid communication with said discharge of said first high pressure pump means, said hydraulic motor pump means driven by said discharge of said first high pressure pump means; and
    (f) first oil supply tank pump means disposed within said oil supply tank means, said first oil supply tank pump means driven by said first hydraulic motor pump means, whereby when said first predetermined low oil pressure is detected during shaft coastdown, the inertia of said shaft drives said emergency lubrication system to maintain an adequate flow of oil to said bearing means.

2. The retrofit friction-hydrostatic emergency lubrication system of claim 1, wherein said first high pressure pump means includes a pair of first high pressure pumps, a first of said first high pressure pumps is mounted on one of said oppositely disposed first wall members and the other of said first high pressure pumps is mounted on the other of said first wall members.

3. The retrofit friction-hydrostatic emergency lubrication system of claim 1, wherein said second high pressure pump means includes a pair of second high pressure pumps, a first of said second high pressure pumps is mounted on one of said oppositely disposed second wall members and the other of said second high pressure pumps is mounted on the other of said second wall members.

4. The retrofit friction-hydrostatic emergency lubrication system of claim 1, further comprising:
    (a) a second sensing and actuator means responsive to a second predetermined low oil pressure at said bearing means;
    (b) second rotatable friction means for contacting said shaft, said second sensing and actuator means upon detecting said second predetermined low oil pressure at said bearing means for causing said second friction means to contact said shaft; and (c) second high pressure pump means having an intake and a discharge in fluid communication with said hydraulic motor pump means and driven by said second rotatable friction means to supplement said first high pressure pump means discharge.

5. The retrofit friction-hydrostatic emergency lubrication system of claim 4, wherein said second friction means comprises second circular resilient wheel means for contacting said shaft, second support means for supporting said second wheel means, third axle means carrying said second wheel means thereon, said third axle means supported by said second support means and disposed parallel to said shaft, said third axle means operatively engaging said second high pressure pump means.

6. The retrofit friction-hydrostatic emergency lubrication system of claim 5, wherein said second support means comprises a second frame means, said second frame means comprising a second bottom member, a pair of oppositely disposed second wall members affixed to said, second bottom member, said second wall members affixed to said second bottom member, said second wall members having fourth aperture means therethrough, said third axle means extending through said fourth aperture means and operatively engaging said second high pressure pump means, a second extension member having fifth aperture means passing therethrough, second pedestal base member means including second baseplate means, a pair of oppositely disposed second vertical side members affixed to said second baseplate means, said vertical side members having a fifth aperture means therethrough, a second pivot means passing through said fourth aperture means of said second wall member and said fifth aperture means of said vertical side members, whereby said second frame means is rotatably mounted on said second pedestal means to engage and disengage said shaft.

7. The retrofit friction-hydrostatic emergency lubrication system of claim 1, wherein said first friction means comprises first circular resilient wheel means for contacting said shaft, first support means for supporting said first wheel means, first axle means carrying said first wheel means thereon, said first axle means supported by said first support means and disposed parallel to said shaft, said first axle means operatively engaging said first high pressure pump means.

8. The retrofit friction-hydrostatic emergency lubrication system of claim 7, wherein said first support means comprises a first frame means, said first frame means comprising a first bottom member, a pair of oppositely disposed first wall members affixed to said bottom member, said first wall members having first aperture means therethrough, said first axle means extending through said first aperture means and operatively engaging said first high pressure pump means, a first extension member affixed to said bottom member, said first extension member having second aperture means passing therethrough, first pedestal base member means including first baseplate means, a pair of oppositely disposed first vertical side members affixed to said first base plate means, said vertical side members having a third aperture means therethrough, a first pivot member means passing through said second aperture means of said wall member and said third aperture means of said vertical side members, whereby said first frame means is rotatably mounted on said first pedestal means to engage and disengage said shaft.

9. The retrofit friction-hydrostatic emergency lubrication system of claim 8, wherein said first support means further comprises first spring means operatively affixed between said first frame means and said first base pedestal member means, whereby the tension of said first spring means normally holds said first wheel means away from said shaft.

10. The retrofit friction-hydrostatic emergency lubrication system of claim 9, wherein said first sensing and actuator means further comprises first arm member means connecting said first sensing and actuator means to said first frame means, whereby when said first sensing and actuator means detects said first predetermined low oil pressure at said bearing means, said first arm means pulls said first wheel means to contact said shaft.

11. The retrofit friction-hydrostatic emergency lubrication system of claim 10, wherein said first arm member means comprises second spring means, whereby slippage of said first wheel means is allowed during initial acceleration of said first wheel means upon contacting said shaft.

12. The retrofit friction-hydrostatic emergency lubrication system of claim 18, wherein said second support means further comprises spring means operatively affixed between said second frame means and said second pedestal base member means whereby the tension of said third spring means normally holds said second wheel means away from said shaft.

13. The retrofit friction-hydrostatic emergency lubrication system of claim 12, wherein said second sensing and actuator means further comprises second arm member means connecting said second sensing and actuator means to said second frame means, whereby when said second sensing and actuator means detects said second predetermined low oil pressure at said bearing means, said second arm means pulls said second wheel means to contact said shaft.

14. The retrofit friction-hydrostatic emergency lubrication system of claim 13, wherein said second arm member means comprises fourth spring means, whereby slippage of said second wheel means is allowed during initial acceleration of said second wheel means upon contacting said shaft.

* * * * *